US010977667B1

(12) United States Patent
L'Huillier

(10) Patent No.: US 10,977,667 B1
(45) Date of Patent: Apr. 13, 2021

(54) METHOD AND SYSTEM FOR PROGRAMMATIC ANALYSIS OF CONSUMER SENTIMENT WITH REGARD TO ATTRIBUTE DESCRIPTORS

(71) Applicant: Groupon, Inc., Chicago, IL (US)

(72) Inventor: Gaston L'Huillier, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 870 days.

(21) Appl. No.: 14/919,111

(22) Filed: Oct. 21, 2015

Related U.S. Application Data

(60) Provisional application No. 62/067,381, filed on Oct. 22, 2014.

(51) Int. Cl.
*G06Q 30/02* (2012.01)
*G06F 16/33* (2019.01)
*G06F 40/205* (2020.01)

(52) U.S. Cl.
CPC ..... *G06Q 30/0201* (2013.01); *G06F 16/3344* (2019.01); *G06F 40/205* (2020.01); *G06Q 30/0282* (2013.01)

(58) Field of Classification Search
CPC .................................................... G06Q 30/02
See application file for complete search history.

(56) References Cited

U.S. PATENT DOCUMENTS

| 5,331,556 | A | 7/1994 | Black et al. |
| 5,706,406 | A | 1/1998 | Pollock |
| 5,963,940 | A | 10/1999 | Liddy et al. |
| 6,577,947 | B1 | 6/2003 | Kronfeld et al. |
| 6,584,464 | B1 | 6/2003 | Warthen |
| 6,910,003 | B1 | 6/2005 | Arnold et al. |
| 6,950,786 | B1 | 9/2005 | Sonneland et al. |
| 7,015,922 | B2 | 3/2006 | Wada |
| 7,107,538 | B1 | 9/2006 | Hinckley et al. |

(Continued)

OTHER PUBLICATIONS

Fuchs, Gil Emanuel; "Practical Natural Language Processing Question Answering Using Graphs"; Dec. 2004; University of California.

(Continued)

*Primary Examiner* — Kurtis Gills
(74) *Attorney, Agent, or Firm* — Alston & Bird LLP

(57) ABSTRACT

Embodiments provide a computer-executable method, computer system and non-transitory computer-readable medium for programmatically assessing consumer sentiment with regard to an attribute descriptor associated with a commercial entity and/or a commercial item. A computer-executed method includes programmatically accessing, via a network device, text of a consumer review and in indication of an attribute descriptor included in the text of the consumer review. The method also includes executing a consumer review processing engine to programmatically analyze the text of the consumer review to generate a sentiment score associated with the attribute descriptor in the context of the consumer review. The method further includes storing, on a non-transitory computer-readable storage device, an indication of the attribute descriptor and the generated sentiment score in association with the commercial entity and/or the commercial item.

16 Claims, 9 Drawing Sheets

(56) References Cited

U.S. PATENT DOCUMENTS

| | | | |
|---|---|---|---|
| 7,444,356 B2 | 10/2008 | Calistri-Yeh et al. | |
| 7,552,365 B1 | 6/2009 | Marsh et al. | |
| 7,600,017 B2 | 10/2009 | Holtzman et al. | |
| 7,765,097 B1* | 7/2010 | Yu | G06F 17/243 |
| | | | 704/9 |
| 7,900,213 B2 | 3/2011 | Elaasar | |
| 7,945,600 B1 | 5/2011 | Thomas et al. | |
| 8,001,144 B2 | 8/2011 | Novak Jasmine | |
| 8,046,348 B1 | 10/2011 | Rehling et al. | |
| 8,195,683 B2 | 6/2012 | Bolivar | |
| 8,209,335 B2 | 6/2012 | Novak | |
| 8,347,326 B2 | 1/2013 | Weitzenfeld et al. | |
| 8,645,295 B1 | 2/2014 | Dillard | |
| 8,862,591 B2 | 10/2014 | Chowdhury et al. | |
| 8,949,243 B1 | 2/2015 | Kashyap et al. | |
| 8,977,953 B1 | 3/2015 | Pierre et al. | |
| 8,983,975 B2 | 3/2015 | Kenton et al. | |
| 9,020,956 B1 | 4/2015 | Barr et al. | |
| 9,063,927 B2* | 6/2015 | Hall | G06F 17/2785 |
| 9,129,008 B1 | 9/2015 | Kuznetsov | |
| 9,317,566 B1 | 4/2016 | L'Huillier et al. | |
| 9,607,325 B1 | 3/2017 | Sriram | |
| 9,924,102 B2 | 3/2018 | Gervautz et al. | |
| 2001/0020292 A1 | 9/2001 | McRobert | |
| 2002/0010637 A1 | 1/2002 | Lieu et al. | |
| 2002/0103809 A1 | 8/2002 | Starzl et al. | |
| 2002/0107834 A1 | 8/2002 | Yen et al. | |
| 2002/0165844 A1 | 11/2002 | Lee et al. | |
| 2003/0004971 A1 | 1/2003 | Gong et al. | |
| 2004/0059736 A1 | 3/2004 | Willse et al. | |
| 2004/0078190 A1 | 4/2004 | Fass et al. | |
| 2004/0186719 A1 | 9/2004 | Polanyi et al. | |
| 2004/0243554 A1 | 12/2004 | Broder et al. | |
| 2005/0028046 A1 | 2/2005 | McArdle | |
| 2005/0060324 A1 | 3/2005 | Johnson et al. | |
| 2005/0108001 A1 | 5/2005 | Aarskog | |
| 2005/0125216 A1 | 6/2005 | Chitrapura et al. | |
| 2005/0149383 A1 | 7/2005 | Zacharia et al. | |
| 2005/0165819 A1 | 7/2005 | Kudoh et al. | |
| 2005/0267871 A1 | 12/2005 | Marchisio et al. | |
| 2006/0069589 A1 | 3/2006 | Nigam et al. | |
| 2006/0248440 A1 | 11/2006 | Rhoads et al. | |
| 2006/0277465 A1 | 12/2006 | Pandit et al. | |
| 2007/0027672 A1 | 2/2007 | Decary et al. | |
| 2007/0073533 A1 | 3/2007 | Thione et al. | |
| 2007/0073745 A1 | 3/2007 | Scott et al. | |
| 2007/0073758 A1 | 3/2007 | Perry et al. | |
| 2007/0094234 A1 | 4/2007 | Wen et al. | |
| 2007/0106499 A1 | 5/2007 | Dahlgren et al. | |
| 2007/0282872 A1 | 12/2007 | Probst et al. | |
| 2008/0109212 A1 | 5/2008 | Witbrock et al. | |
| 2008/0133488 A1 | 6/2008 | Bandaru et al. | |
| 2008/0154883 A1 | 6/2008 | Chowdhury et al. | |
| 2008/0201348 A1 | 8/2008 | Edmonds et al. | |
| 2008/0249764 A1 | 10/2008 | Huang et al. | |
| 2008/0294637 A1 | 11/2008 | Liu | |
| 2009/0063247 A1 | 3/2009 | Burgess et al. | |
| 2009/0063304 A1 | 3/2009 | Meggs | |
| 2009/0077069 A1 | 3/2009 | Polanyi et al. | |
| 2009/0112892 A1 | 4/2009 | Cardie et al. | |
| 2009/0193328 A1 | 7/2009 | Reis et al. | |
| 2009/0216524 A1 | 8/2009 | Skubacz et al. | |
| 2009/0217208 A1 | 8/2009 | Mushtaq et al. | |
| 2009/0222551 A1 | 9/2009 | Neely et al. | |
| 2009/0282019 A1 | 11/2009 | Galitsky et al. | |
| 2009/0319342 A1* | 12/2009 | Shilman | G06F 17/30864 |
| | | | 705/7.41 |
| 2010/0038416 A1 | 2/2010 | Canora | |
| 2010/0198584 A1* | 8/2010 | Habu | G06F 17/27 |
| | | | 704/9 |
| 2011/0078167 A1 | 3/2011 | Sundaresan et al. | |
| 2011/0196927 A1* | 8/2011 | Vance | G06Q 10/107 |
| | | | 709/204 |
| 2012/0066233 A1 | 3/2012 | Fonseka et al. | |
| 2012/0101808 A1* | 4/2012 | Duong-Van | G06F 17/2785 |
| | | | 704/9 |
| 2012/0209828 A1 | 8/2012 | Takenaka et al. | |
| 2012/0254060 A1 | 10/2012 | Choudhary et al. | |
| 2012/0278064 A1* | 11/2012 | Leary | G06F 17/274 |
| | | | 704/9 |
| 2012/0278253 A1 | 11/2012 | Gahlot et al. | |
| 2012/0290606 A1 | 11/2012 | Kumar et al. | |
| 2012/0290910 A1 | 11/2012 | Kumar et al. | |
| 2013/0018892 A1 | 1/2013 | Castellanos et al. | |
| 2013/0031062 A1 | 1/2013 | Iwamoto | |
| 2013/0080208 A1* | 3/2013 | Wang | G06Q 30/01 |
| | | | 705/7.32 |
| 2013/0103667 A1* | 4/2013 | Minh | G06F 17/30864 |
| | | | 707/709 |
| 2013/0218822 A1 | 8/2013 | Remaker | |
| 2013/0247183 A1 | 9/2013 | Kumar et al. | |
| 2013/0263019 A1 | 10/2013 | Castellanos et al. | |
| 2013/0268457 A1 | 10/2013 | Wang et al. | |
| 2013/0268534 A1 | 10/2013 | Mathew et al. | |
| 2013/0311315 A1 | 11/2013 | Zises | |
| 2014/0067596 A1 | 3/2014 | McGovern et al. | |
| 2014/0136541 A1 | 5/2014 | Farahat et al. | |
| 2014/0188459 A1 | 7/2014 | Fink et al. | |
| 2014/0278786 A1 | 9/2014 | Liu-Qiu-Yan | |
| 2015/0066803 A1 | 3/2015 | Aneja et al. | |
| 2015/0100554 A1 | 4/2015 | Wang et al. | |
| 2015/0186790 A1 | 7/2015 | Ehlen et al. | |
| 2015/0286627 A1 | 10/2015 | Chang et al. | |
| 2015/0286710 A1 | 10/2015 | Chang et al. | |
| 2015/0286928 A1 | 10/2015 | Demiralp et al. | |
| 2016/0275573 A1 | 9/2016 | L'Huillier et al. | |

OTHER PUBLICATIONS

Notice of Allowance for U.S. Appl. No. 12/119,465 dated Jan. 4, 2017.

Patent Board Decision, Dec. 5, 2016, p. 6 (Year: 2016).

Sato et al. "Topic Models with Power-Law Using Pitman-Yor Process", Jul. 25-28, 2010, KDD10, pp. 673-681.

Office Action for corresponding U.S. Appl. No. 12/119,465 dated Dec. 30, 2010.

Office Action for U.S. Appl. No. 15/073,486 dated Sep. 19, 2016.

U.S. Appl. No. 61/922,786, filed Dec. 31, 2013.

U.S. Appl. No. 62/030,549, filed Jul. 29, 2014, In re: L'Huillier et al. entitled *Method and System for Programmatic Analysis of Consumer Reviews*.

U.S. Appl. No. 62/018,456, filed Jun. 27, 2014, In re: Landon et al. entitled *Method and System for Programmatic Generation of Survey Queries*.

U.S. Appl. No. 62/033,090, filed Aug. 4, 2014, In re: L'Huillier et al. entitled *System and Method for Programmatic Generation of Attribute Descriptors*.

U.S. Appl. No. 14/752,311, filed Jun. 26, 2015; In re: Landgon et al., entitled *Method and System for Programmatic Generation of Survey Queries*.

Sentence Patterns—The Writing Center, [online], [retrieved from the Internet Sep. 28, 2018] <URL: http://writingcenter.unc.edu/tips-and-tools/sentence-patterns/> 5 pages.

Das, S.R. et al., *Yahoo! for Amazon: Sentiment Extraction from Small Talk on the Web*, Management Science, (Jan. 5, 2006) pp. 1-30.

Gamon, M., *Sentiment Classification on Customer Feedback Data: Noisy Data, Large Feature Vectors, and the Role of Linguistic Analysis*, International Conference on Computational Linguistics, (2004) 7 pages.

Garcia, A. et al., *Defeasible Logic Programming an Argumentative Approach*, Theory and Practice of Logic Programming, (2004) [online] [retrieved Dec. 14, 2015]. Retrived from the internet: <URL: http://cs.uns.edu.ar/—ajg/papers/2004TPLPGarciaSimari.pdf> 95-137.

Glance, N. et al., *Deriving Marketing Intelligence from Online Discussion*, KDD '05, ACM , Chicago, Illinois, USA, (Aug. 21-24, 2005) 9 pages.

(56) References Cited

OTHER PUBLICATIONS

International Search Report and Written Opinion for corresponding International Application No. PCT/US09/43658 dated Jul. 14, 2009, 8 pages.
*Kango Announces Series a Funding and Private Beta Status*, Press Release. UpTake Networks, Inc., 2007, [Online] [Retrieved on Jun. 25, 2009] Retrieved from the internet<URL: http://www.uptake.com/documents/press/121807.pdf> 2 pages.
Marneffe, M.C. et al., *Stanford typed dependencies manual*, [online] [retrieved Dec. 14, 2015]. Retrieved from the internet: <URL: http://nlp.stanford.edu/software/dependencies_manual.pdf>. (Sep. 2008) 28 pages.
Notice of Allowance for corresponding U.S. Appl. No. 14/727,852 dated Dec. 16, 2015.
Office Action for corresponding U.S. Appl. No. 12/119,465 dated Apr. 4, 2013.
Office Action for corresponding U.S. Appl. No. 12/119,465 dated Aug. 24, 2011.
Office Action for corresponding U.S. Appl. No. 12/119,465 dated Jan. 8, 2014.
Office Action for corresponding U.S. Appl. No. 12/119,465 dated May 22, 2014.
Office Action for corresponding U.S. Appl. No. 12/119,465 dated Sep. 7, 2012.
Office Action for corresponding U.S. Appl. No. 14/727,852 dated Sep. 18, 2015.
*Opinion Mining, Sentiment Analysis, and Opinion Spam Detection* [online] [retrieved Jun. 11, 2015]. Retrieved from the Internet: URL:http://www.cs.uic.edu/—liub/FBS/sentiment-analysis. html#lexicon. 8 pages.
Pang, B. et al., *Thumbs Up? Sentiment Classification Using Machine Learning Techniques*, in Proceedings of the Conference on Empirical Methods in Natural Language Processing (EMNLP) 2002, Philadelphia (Jul. 2002), 8 pages.
*SentiWordNet* [online] [retrieved Jun. 11, 2015]. Retrieved from the Internet: URL:http://sentiwordnet.isti.cnr.it/. 2 pages.
Shanahan, J. et al., *Computing Attitude and Affect in Text: Theory and Applications*, Springer, Dordrecht, Netherlands (2006) pp. 265-279.
Wiebe, J. et al., *Identifying Collocations for Recognizing Opinions*, in Proceedings of ACL/EACL '01 Workshop on Collocation, Toulouse, France (Jul. 2001) 8 pages.
U.S. Appl. No. 14/811,521, filed Jul. 28, 2015, In re: L'Hullier et al. entitled *System and Method for Programmatic Generation of Attribute Descriptors*.
U.S. Appl. No. 14/727,852, filed Jun. 1, 2015, In re: L'Hullier et al. entitled *Method and System for Programmatic Analysis of Consumer Reviews*.

\* cited by examiner

METHOD AND SYSTEM FOR PROGRAMMATIC ANALYSIS OF CONSUMER SENTIMENT WITH REGARD TO ATTRIBUTE DESCRIPTORS

CROSS-REFERENCE TO RELATED APPLICATIONS

This application claims the benefit of U.S. Provisional Patent Application No. 62/067,381, titled "Method and System for Programmatic Analysis of Consumer Sentiment with Regard to Attribute Descriptors," filed Oct. 22, 2014, which is incorporated by reference herein in its entirety.

TECHNOLOGICAL FIELD

Example embodiments of the present invention relate generally to attribute descriptors for commercial entities (e.g., merchants) and commercial items (e.g., products, services, experiences, promotions) and, more particularly, to a computer-executable method, computer system and computer apparatus for programmatically assessing consumer sentiment with regard to attribute descriptors.

BACKGROUND

Certain commercial retailers enable consumers to rate and review merchants and products. In this regard, areas for improving conventional techniques for automated processing, analysis, interpretation and use of consumer sentiment regarding attribute descriptors have been identified and technical solutions have been implemented in exemplary embodiments.

BRIEF SUMMARY

In accordance with one exemplary embodiment, a computer-executed method is provided for programmatically generating a sentiment score associated with an attribute descriptor, the attribute descriptor associated with a commercial entity and/or a commercial item (e.g., at least one of a commercial entity or a commercial item). The computer-executed method includes programmatically accessing, via a network device, text of a consumer review and an indication of an attribute descriptor included in the text of the consumer review. The computer-executed method also includes executing a consumer review processing engine to programmatically analyze the text of the consumer review to generate a sentiment score associated with the attribute descriptor. The computer-executed method further includes storing, on a non-transitory computer-readable storage device, an indication of the attribute descriptor and the sentiment score in association with the commercial entity and/or the commercial item.

In certain non-limiting embodiments, the execution of the consumer review processing engine includes: executing a natural language processing engine to parse the text of the consumer review and thereby generate a data structure representing a dependency grammar of the text of the consumer review; programmatically attempt to match the attribute descriptor and the data structure to a set of grammar rules; and upon identifying a match between a first grammar rule and the attribute descriptor and the data structure, programmatically generating the sentiment score based on the first grammar rule.

In certain non-limiting embodiments, the execution of the consumer review processing engine includes, upon determining lack of a match between the set of grammar rules and the attribute descriptor and the data structure, programmatically generating the sentiment score based on a consumer review sentiment score associated with the text of the consumer review.

In certain non-limiting embodiments, the computer-executed method includes: programmatically analyzing prior purchase data or profile data associated with a first consumer to generate a first attribute descriptor of interest to the first consumer; programmatically matching the first attribute descriptor to the attribute descriptor included in the text of the consumer review; and based on the matching, transmitting computer-executable instructions to a computing device associated with the first consumer to cause a visual display device associated with the computing device to display the attribute descriptor and the sentiment score in association with the commercial entity and/or the commercial item.

In certain non-limiting embodiments, the computer-executed method includes: programmatically analyzing prior purchase data or profile data associated with a first consumer to generate a first attribute descriptor of interest to the first consumer; programmatically matching the first attribute descriptor to the attribute descriptor included in the text of the consumer review; and based on the matching and based on the generated sentiment score associated with the attribute descriptor, transmitting computer-executable instructions to a computing device associated with the first consumer to cause a visual display device associated with the computing device to display a recommendation of the commercial entity and/or the commercial item. In certain non-limiting cases, the recommendation may include an impression of a promotion provided by a promotion and marketing service in association with the commercial entity and/or the commercial item.

In accordance with another exemplary embodiment, one or more non-transitory computer-readable media are provided. The one or more non-transitory computer-readable media have encoded thereon computer-executable instructions that, when executed on a computer processor, cause a computer-executed method to be performed. The computer-executed method includes programmatically accessing, via a network device, text of a consumer review and an indication of an attribute descriptor included in the text of the consumer review. The computer-executed method also includes executing a consumer review processing engine to programmatically analyze the text of the consumer review to generate a sentiment score associated with the attribute descriptor. The computer-executed method further includes storing, on a non-transitory computer-readable storage device, an indication of the attribute descriptor and the sentiment score in association with the commercial entity and/or the commercial item.

In accordance with another exemplary embodiment, a computer apparatus is provided. The computer apparatus includes a network device configured to receive text of a consumer review and an indication of an attribute descriptor included in the text of the consumer review. The computer apparatus also includes a consumer review processing engine for programmatically analyzing the text of the consumer review to generate a sentiment score associated with the attribute descriptor. The computer apparatus further includes a non-transitory computer-readable storage device for storing an indication of the attribute descriptor and the sentiment score in association with the commercial entity and/or the commercial item.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings.

Figure 1:
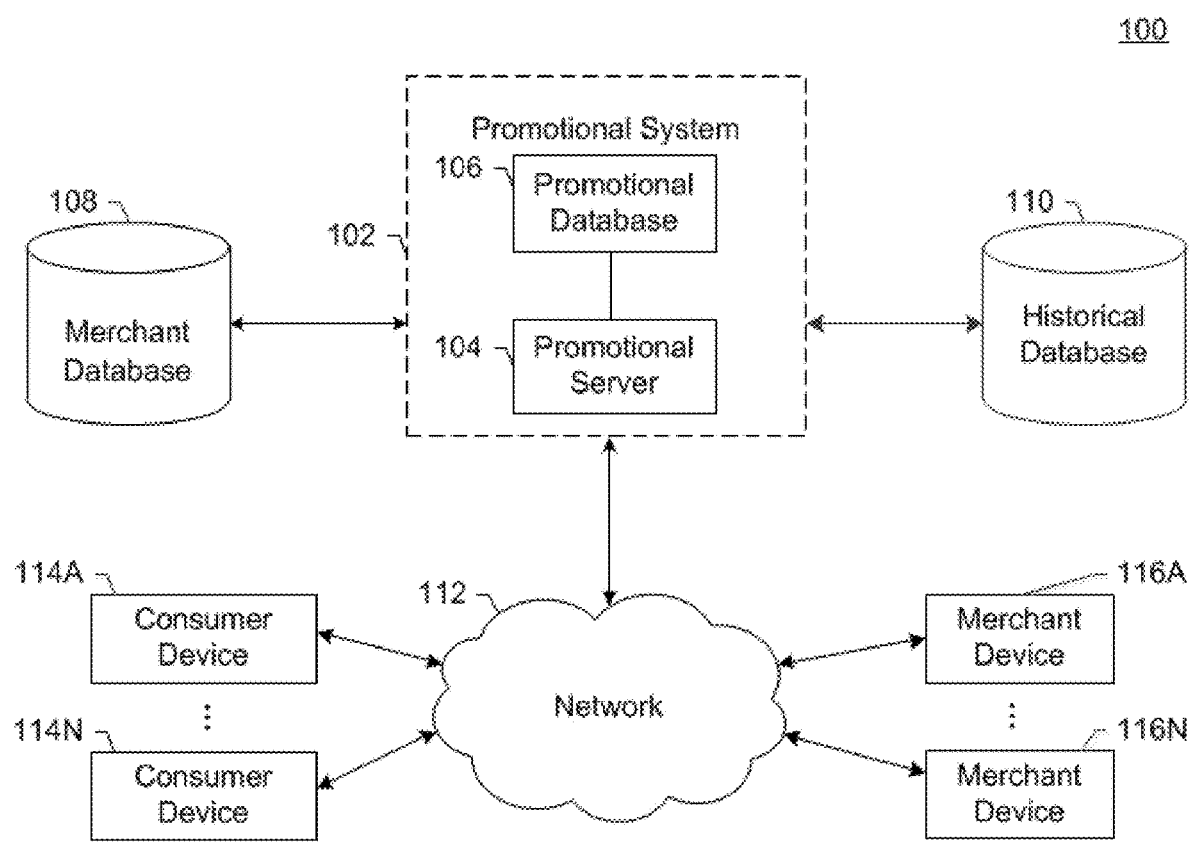
FIG. 1 is a block diagram illustrating an exemplary system within which exemplary embodiments may operate.

The accompanying drawings are not intended to be drawn to scale.

DETAILED DESCRIPTION

Exemplary embodiments provide computer systems, computer-executable methods and one or more non-transitory computer-readable media for programmatically assessing consumer sentiment with regard to an attribute descriptor associated with a commercial entity and/or a commercial item. In certain embodiments, a sentiment score may be generated and assigned to an attribute descriptor. In certain embodiments, the sentiment score for the attribute descriptor may be generated based on programmatic analysis of one or more consumer reviews that includes a mention of the attribute descriptor. The consumer reviews may include free-text and, in some cases, an alphanumeric rating.

Quantitative and/or qualitative assessments of attribute descriptors associated with commercial entities or items facilitate future consumers in making purchase decisions, but conventional assessment techniques of using consumer review information suffer from numerous deficiencies. Certain conventional assessment techniques require a consumer to present an overall review for a merchant or product even though making a purchase decision based on an overall review is often difficult. For example, a consumer review may indicate several positive and negative sentiments about the different attribute descriptors of a merchant, and combining such sentiments into an overall impression of the merchant is non-trivial. Additionally, certain conventional techniques do not enable normalization of review information among consumers or even between qualitative and quantitative reviews of the same consumer. Furthermore, reviews are long and difficult to produce and to read, which results in few consumers writing reviews or perusing them.

Exemplary embodiments address deficiencies in conventional consumer review processing techniques by, for example, programmatically generating one or more sentiment scores for one or more attribute descriptors regarding a commercial entity or item from consumer reviews. Different sentiment scores generated for the same attribute descriptor for the same commercial entity/item based on different consumer reviews may be aggregated in suitable ways (e.g., by taking a raw or weighted average or median of the sentiment scores) to generate an aggregate sentiment score for the attribute descriptor associated with the commercial entity/item.

In some embodiments, an "attribute descriptor" may be a textual piece of data regarding the commercial entity or item.

In certain cases, an attribute descriptor for a commercial entity (e.g., a merchant) may indicate a commercial item, such as a product or service sold by the merchant (e.g., "pasta," "burgers").

In certain cases, an attribute descriptor for a commercial item (e.g., a food item) may indicate a component, constituent or character of the item (e.g., vegetarian, fatty, gluten-free).

In certain cases, an attribute descriptor may indicate a contextual description or opinion describing a contextual feature or attribute of a commercial entity or item. Exemplary contextual attribute descriptors may describe, for example, a setting (e.g., attribute descriptor "romantic" may describe a restaurant as having a romantic setting), a situation, a physical environment (e.g., attribute descriptor "music"), hygiene, price level (e.g., attribute descriptor "cost"), a physical location (e.g., attribute descriptor "neighborhood safety"), and the like.

In certain cases, an attribute descriptor may indicate a quality associated with a commercial entity or item. Exemplary quality attribute descriptors may describe, for example, durability (e.g., attribute descriptor "rugged" may describe a durable pair of hiking boots), fragility (e.g., attribute descriptor "brittle"), size and/or weight (e.g., attribute descriptor "small and light"), cost effectiveness (e.g., attribute descriptor "value for money"), quality of customer service (e.g., attribute descriptor "customer service"), performance, and the like.

In certain cases, an attribute descriptor may indicate an event or happening regarding a commercial entity or item. Exemplary event attribute descriptors may indicate, for example, whether a consumer had to return a commercial item (e.g., attribute descriptor "returned it"), a consumer's specific experience (e.g., attribute descriptor "fails after 2 months"), and the like.

In certain cases, an attribute descriptor may broadly indicate a feature, categorization or sub-categorization of any feature of a commercial entity or item. Exemplary category or sub-category attribute descriptors may describe, for example, a subject matter associated with the commercial entity or item (e.g., attribute descriptor "outdoorsy" may describe an outdoor equipment retail store), a genre of a product (e.g., attribute descriptor "authentic Italian" or "fresh sushi" may describe a type of food sold by a restaurant), a feature or component of a commercial item (e.g., attribute descriptor "spicy" may describe food that is spicy, attribute descriptor "good for gaming" may describe a laptop that has a fast processor and good graphics, attribute descriptor "screen quality" may describe a laptop with a good quality screen), and the like.

In certain cases, an attribute descriptor may indicate a combination of two or more attributes of a commercial entity or item.

In certain embodiments, an attribute descriptor may have a predetermined maximum phrase, word or alphanumeric character length, e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, etc.

Sentiment scores for certain attribute descriptors may be programmatically generated from consumer review information provided by consumers, for example, from consumer reviews, ratings and survey responses. In certain non-limiting cases, the consumer review information may be in the form of reviews that include structured or unstructured text. For structured text reviews, exemplary embodiments may programmatically generate attribute descriptors based on the names of the text fields (e.g., a text field titled "customer service" may be used to generate an attribute descriptor "customer service"). In certain cases, the consumer review information (e.g., reviews, ratings and survey responses) may be accessed from Internet websites using, for example, a web crawler. In certain cases, the consumer reviews, ratings and survey responses may be accessed from a database associated with a promotion and marketing service. One or more consumer ratings or reviews usable to determine an attribute descriptor may include one or more of: one or more quantitative ratings, one or more qualitative reviews, and the like.

In certain embodiments, a visual user interface may be customized for each consumer so that one or more commercial entities or items are programmatically selected for display for that particular consumer. For example, attribute descriptors on the commercial entity or item may be compared to attribute descriptors of interest to the consumer to determine if the commercial entity or item is of relevance or interest to the consumer and, if so, to display information related to the commercial entity or item. For example, if an attribute descriptor for a merchant indicates that it is has a good wine selection, and if consumer information indicates that a consumer enjoys wine, then the restaurant may be determined to be of relevance to the consumer and displayed on a computing device of the consumer.

In some embodiments, for a particular attribute descriptor (e.g., wine), a plurality of commercial entities may be displayed for a consumer. The commercial entities for the attribute descriptor may be selected or ranked for display based on the sentiment scores for the attribute descriptor for each commercial entity.

Certain embodiments may provide different visualization options to provide rating or review information in a succinct and easy to view manner. For example, consumers may be allowed to quickly differentiate between high and low sentiment scores (e.g., by indicating attribute descriptors for one or more commercial entities/items having sentiment scores above a predetermined threshold in green font, and by indicating attribute descriptors for one or more commercial entities/items having sentiment scores below a predetermined threshold in red font). Consumers may also be allowed to read individual consumer reviews, and may be allowed to view the sentiment scores associated with the attribute descriptors in the consumer reviews.

In some cases, a consumer may be allowed to adjust the display of attribute descriptors associated with a commercial entity or item, for example, based on relevance or interest to the consumer, based on whether the attribute descriptor is spam, and the like.

I. Definitions of Terms

Certain terms used in connection with exemplary embodiments are defined below.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "merchant" may include, but is not limited to, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "commercial entity" may include any commercial actor including, but not limited to, an individual, a consumer, a buyer, a seller, a group of individuals, a company, a retailer, a wholesaler, a service provider, a promotion and marketing service, and the like.

As used herein, the term "commercial item" may include any good, service, experience or promotion that may be purchased or sold.

As used herein, the term "consumer interface" may include any digitally rendered user interface displayed on a visual display device for enabling a consumer to interface with a promotion and marketing service. An exemplary consumer interface may enable a consumer to view one or more promotions, purchase one or more promotions, share one or more promotions with other consumers, receive messages and/or promotions from other consumers, receive messages from the promotion and marketing service, and the like. Exemplary consumer interfaces may be rendered in any desired form including, but not limited to, as a mobile application for display on a mobile computing device (e.g., a smartphone), a webpage or website for display on a mobile or non-mobile computing device via the Internet, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "promotion score" refers to a programmatically generated quantitative or qualitative score or indication of the expected effectiveness of providing an impression of a promotion to a consumer. In some embodiments, the expected effectiveness may be indicated by a predicted probability or likelihood that the consumer will purchase the promotion offered by an impression.

As used herein, the term "impression" may include a communication, a display, or other perceived indication, such as a flyer, print media, e-mail, text message, application alert, mobile applications, mobile notifications, other type of electronic interface or distribution channel and/or the like, of one or more promotions. For example, and using the aforementioned running company as the example provider, an e-mail communication sent to consumers that indicates the availability of a promotion of $25 for $50 toward running shoes.

As used herein, the term "voucher" may include, but is not limited to, any type of gift card, tender, electronic certificate, medium of exchange, or the like, that embodies the terms of the promotion from which it results and which may be used toward at least a portion of the purchase, acquisition, procurement, consumption, or the like, of goods, services and/or experiences. In some examples, a voucher may take the form of tender that has a given value that is exchangeable for goods, services and/or experiences and/or a reduction in a purchase price of a particular good, service or experience. In some examples, the voucher may have multiple values, such as an accepted value, a promotional value and/or a residual value. For example, using the aforementioned running company as the example provider, a voucher may comprise an electronic indication in a mobile application that shows $50 of value to spend at the running company. In some examples, the accepted value of the voucher is defined by the value exchanged for the voucher. In some examples, the promotional value of the voucher is defined by the promotion from which the voucher resulted and is the value of the voucher beyond the accepted value. In some examples, the residual value of the voucher is the value after redemption, the value after the expiry or other violation of a redemption parameter, the return or exchange value of the voucher, or the like.

As used herein, the term "redemption" may include the use, exchange or other presentation of a voucher for at least a portion of a good, service or experience as defined by the voucher and its related offer. In some examples, redemption includes the verification of validity of the voucher. In other example embodiments, redemption may include an indication that a particular voucher has been redeemed and thus no longer retains an actual, promotional and/or residual value (e.g., full redemption). In other example embodiments, redemption may include the redemption of at least a portion of a voucher's actual, promotional and/or residual value (e.g., partial redemption). An example of redemption, using the aforementioned running company as the example provider, is exchanging a $50 voucher and $50 for a $100 pair of running shoes.

As used herein, the terms "mobile computing device" and "mobile device" refer to any computing or communication device that is portable and is transported in normal usage (e.g., the iPhone™ mobile communication device, the Android™ mobile communication device, and the like), and that is capable of communication and that has sufficient processor power and memory capacity to perform the operations described herein. For example, and without limitation, a mobile computing device may include a smartphone, a table computer, a laptop computer, and the like.

As used herein, the terms "application program," "mobile application" and "mobile app" refer to computer-executable application software programmed or configured to run on a processing unit of a mobile computing device.

As used herein, the term "promotion application program" refers to an application program programmed or configured to run on a processing unit of a mobile computing device in order to enable a user of the computing device to use a promotion and marketing service. An exemplary promotion application program may be in constant or periodic communication with a remote computing device or server run by the promotion and marketing service to provide computer-executable functionality to the mobile computing device. An exemplary promotion application program may, for example, provide a user interface configured to render impressions of one or more promotions, receive user input selecting one or more impressions, and enable purchase of the promotions in response to user input.

As used herein, the term "module," encompasses hardware, software and/or firmware configured to perform one or more particular functions.

As used herein, the term "computer-readable medium" refers to a non-transitory storage hardware, non-transitory storage device or non-transitory computer system memory that may be accessed by a controller, a microcontroller, a computational system or a module of a computational system to encode thereon computer-executable instructions or software programs. The "computer-readable medium" may be accessed by a computational system or a module of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like.

As used herein, the term "set" refers to a collection of one or more items.

As used herein, the term "plurality" refers to two or more items.

As used herein, the terms "equal" and "substantially equal" refer interchangeably, in a broad lay sense, to exact equality or approximate equality within some tolerance.

As used herein, the terms "similar" and "substantially similar" refer interchangeably, in a broad lay sense, to exact sameness or approximate similarity within some tolerance.

As used herein, the terms "couple," "coupled" and "coupling" refer to a direct or indirect connection among two or more components. For example, a first component may be coupled to a second component directly or through one or more intermediate components.

II. Exemplary Embodiments

Some exemplary embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Although certain embodiments are described herein with reference to promotions and a promotion and marketing service, certain other embodiments are not thusly limited and may be implemented generally and without specific reference to promotions to a promotion and marketing service.

FIG. 1 is a block diagram illustrating an exemplary system within which exemplary embodiments may operate. An exemplary promotion and marketing service 100 may manage a promotional system 102 for managing the offer, purchase, and redemption of a set of promotions. Consumers and merchants may access the promotional system 102 via a network 112 (such as the Internet, or the like) using computer devices 114A through 114N and 116A through 116N, respectively. The promotional system 102 may include a promotional server 104 in communication with a promotional database 106 that stores the set of promotions managed by the promotion and marketing service. The promotion system 102 may have access to a merchant database or any suitable data storage structure 108 storing information on one or more merchants, one or more products offered by a merchant, one or more services offered by a merchant, and the like. The promotional system 102 may have access to a historical database or any suitable data storage structure 110 storing information regarding one or more of: promotions and impressions previously distributed to consumers, consumer profile data, prior activities performed by consumers with respect to promotions and impressions, prior activities performed by consumers with respect to commercial entities or items, and the like. In various embodiments, promotional database 106, merchant database 108 and historical database 110 may be distinct databases, or may alternatively refer to a single database. In certain embodiments, merchant database 108 and historical database 110 may be provided independently of a promotional system 102.

Figure 2:
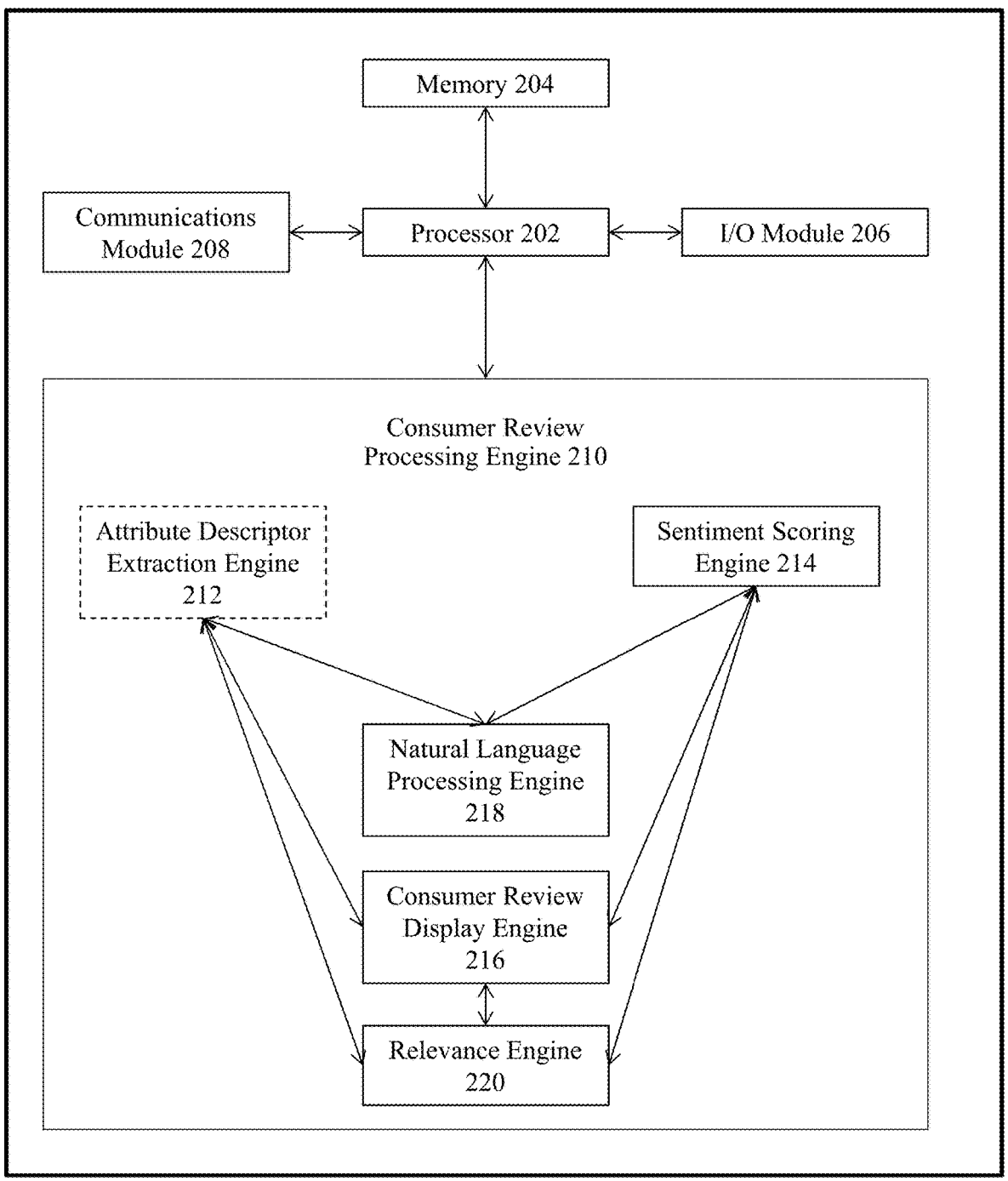
FIG. 2 is a block diagram illustrating exemplary modules of a computing device for use in a promotional server in accordance with certain exemplary embodiments.

The promotional server 104 may be embodied by a computing system, such as apparatus 200 shown in FIG. 2.

As illustrated in FIG. 2, the apparatus 200 may include a computer processor or computer processing module 202, a memory 204, an input/output module 206, and a communications module 208.

In some embodiments, the apparatus 200 may include a consumer review processing engine 210 programmed or configured to programmatically and automatically generate sentiment scores associated with one or more attribute descriptors associated with one or more commercial entities/items. The consumer review processing engine 210 may take as input the text of a consumer review for a commercial entity/item and an indication of an attribute descriptor included or mentioned in the consumer reviews. In some non-limiting embodiments, the consumer review processing engine 210 may extract and the attribute descriptor based on analysis of the text of the consumer review. In certain cases, the consumer review processing engine 210 may also accept as input a predetermined set of grammar rules and a predetermined set of adjectives.

In some embodiments, the consumer review processing engine 210 may output an sentiment score for the attribute descriptor based on the consumer review.

In certain non-limiting embodiments, the consumer review processing engine 210 may include an attribute descriptor extraction engine 212 programmed or configured to programmatically extract one or more attribute descriptors from a consumer review. The attribute descriptor extraction engine 212 may implement and run computer-executed natural language processing techniques to identify words and/or phrases that may represent aspects or attribute descriptors for commercial entities and/or items. In one embodiment, an attribute descriptor extraction engine 212 may generate a numerical score indicating the importance or usefulness of the identified attribute descriptor in the consumer review. The attribute descriptor extraction engine 212 may thereby generate a set or list of all useful or important attribute descriptors identified in the consumer review. For example, a consumer review that states "excellent burgers and good margaritas" may be analyzed to generate an attribute descriptor list of "burgers, margaritas."

The consumer review processing engine 210 may include a sentiment scoring engine 214 programmed or configured to programmatically generate a sentiment score for an attribute descriptor associated with a commercial entity/item based on one or more consumer reviews. For example, an overall positive review may be assigned a positive sentiment score, an overall negative review may be assigned a negative sentiment score, an overall neutral review may be assigned a score of zero. The magnitude of a sentiment score may indicate an intensity or strength of a sentiment expressed in the consumer review. For example, consumer reviews that state "excellent burgers" and "good burgers" may both have positive sentiments ("excellent" and "good," respectively), but the former may have a higher-magnitude positive sentiment score than the latter.

The consumer review processing engine 210 may include a natural language processing engine 218 programmed or configured to perform natural language processing techniques on the text of consumer reviews. The natural language processing engine 218 may be in data communication with the attribute descriptor extraction engine 212 and the sentiment scoring engine 214.

The consumer review processing engine 210 may include a consumer review display engine 216 programmed or configured to selectively display consumer review information (e.g., attribute descriptor, sentiment score) on a visual display device. Exemplary methods of displaying consumer review information are presented in connection with FIGS. 6 and 7. The consumer review display engine 216 may be in data communication with the attribute descriptor extraction engine 212 and the sentiment scoring engine 214.

The consumer review processing engine 210 may include a relevance engine 220 programmed or configured to determine a relevance of a commercial entity or item for a particular consumer based on the consumer's information and based on the commercial entity or item's consumer review information (e.g., attribute descriptor, sentiment score). Exemplary methods of displaying consumer review information are presented in connection with FIG. 7. The relevance engine 220 may be in data communication with the attribute descriptor extraction engine 212 and the sentiment scoring engine 214.

In some embodiments, the processor 202 (and/or co-processor or any other processing circuitry assisting or otherwise associated with the processor) may be in communication with the memory 204 via a bus for transmitting information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example, include one or more processing devices configured to perform independently. Additionally or alternatively, the processor 202 may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display. In such embodiments, the user interface may comprise a web user interface, a mobile application, a client device, a kiosk, or the like. In some embodiments, the input/output module 206 may also include a keyboard, a mouse, a touch screen, touch areas, soft keys, a microphone, a speaker, or other input/output mechanisms. The processor, or user interface circuitry including the processor, may be configured to control one or more functions of one or more user interface elements through computer program instructions (e.g., software and/or firmware) stored on a memory accessible to the processor (e.g., memory 204, onboard memory of the processor, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

In one embodiment, a consumer or merchant may use the apparatus 200 (e.g., as a kiosk) to communicate with the promotional system 102 to view promotion information or interact with promotions. However, in some embodiments of the present invention, the consumer or merchant may perform these functions from outside of the promotional system 102 using, for example, an end-user device, such as consumer device 114 or merchant device 116.

Figure 3:
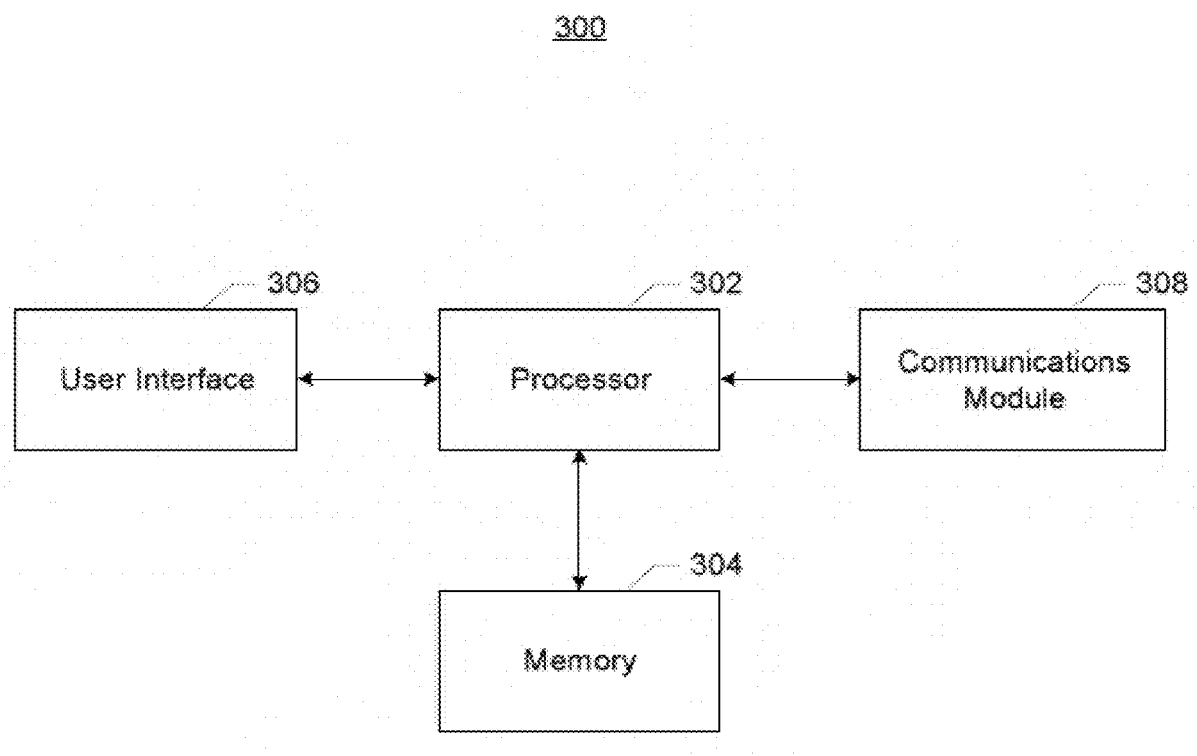
FIG. 3 is a block diagram illustrating exemplary modules of a computing device for use by a consumer or merchant in accordance with an exemplary embodiment.

Referring now to FIG. 3, a block diagram is illustrated showing an example end-user device, apparatus 300 that may be configured to enable a user to view promotions from outside the promotional system 102, in accordance with embodiments of the present invention. In FIG. 3, the apparatus 300, which may embody consumer device 114 or merchant device 116, may include or otherwise be in communication with a processor 302, a memory 304, a communications module 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions, the instructions may specifically configure the processor 302 to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface 306 may include a display and may comprise a web user interface, a mobile application, a client device, a kiosk, or the like. In some embodiments, the user interface 306 may also include a keyboard, a mouse, a touch screen, touch areas, soft keys, a microphone, a speaker, or other input/output mechanisms. The processor 302, or user interface circuitry comprising the processor 302, may be configured to control one or more functions of one or more user interface elements through computer program instructions (e.g., software and/or firmware) stored on a memory accessible to the processor (e.g., memory 304, and/or the like).

Meanwhile, the communications module 308 may be any means such as a device or circuitry embodied in either hardware or a combination of hardware and software that is configured to receive and/or transmit data from/to a network and/or any other device or module in communication with the apparatus 300 (e.g., promotional server 104 or, more generally, promotional system 102, other consumer devices 114 or merchant devices 116, or the like). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The sentiment scoring engine 214 may generate a sentiment score for an attribute descriptor associated with a commercial entity/item, the sentiment score being a numerical score that indicates a sentiment or feeling expressed by consumers with regard to the attribute descriptor associated with the commercial entity/item. In some embodiments, an overall positive sentiment may be indicated by positive numerical scores, an overall negative sentiment may be indicated by negative numerical scores, with the magnitude of the sentiment score proportion to the intensity of the overall sentiment. Unknown or neutral sentiments may be indicated by a sentiment score of zero.

The sentiment scoring engine 214 may programmatically process consumer reviews in generating a sentiment score. For example, a consumer review stating "great burgers" includes an attribute descriptor of "burgers" and a sentiment score associated with the attribute descriptor that indicates that the qualifier of "great" expresses a positive sentiment.

Figure 4:
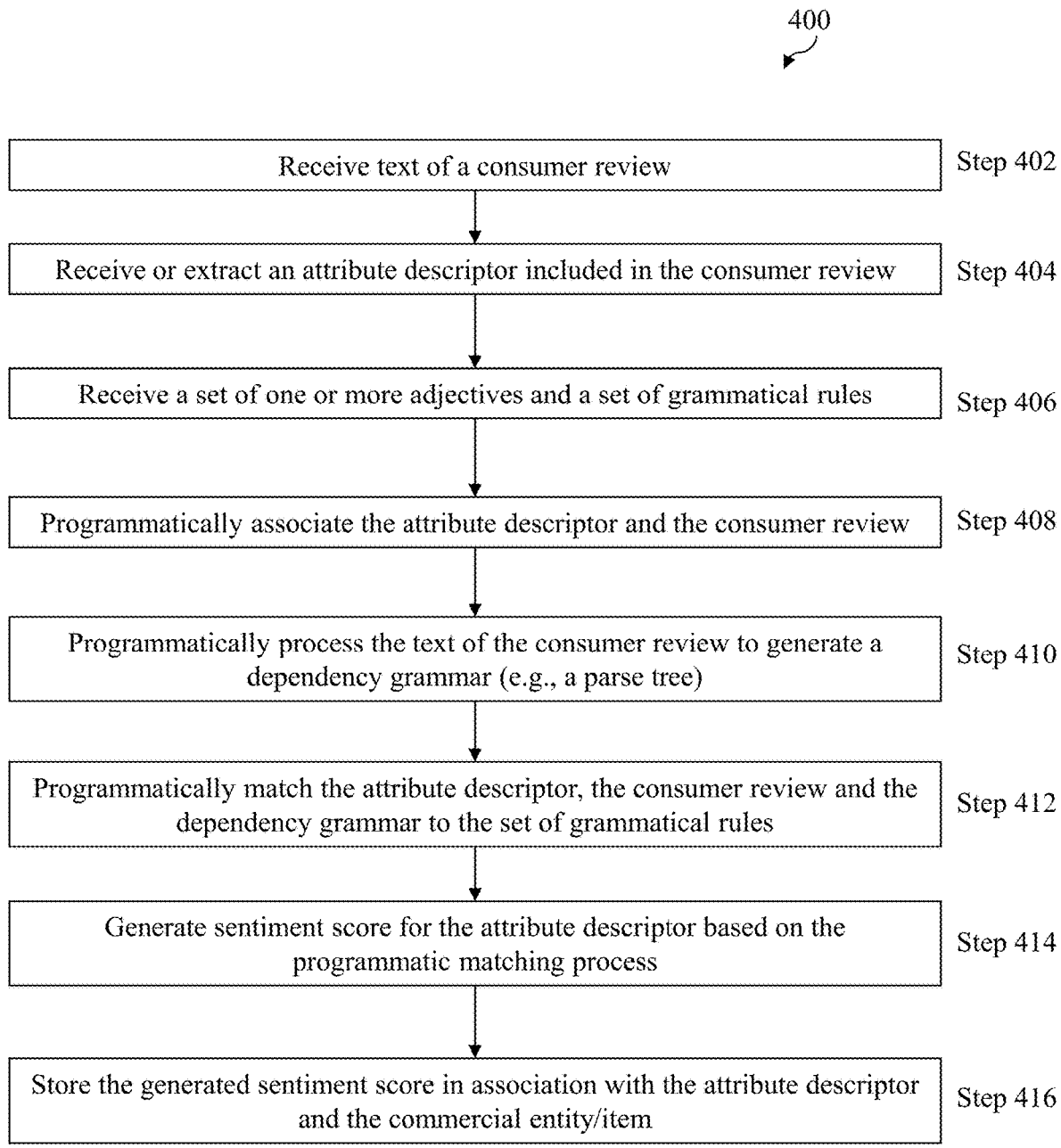
FIGS. 4 and 5 are flowcharts illustrating exemplary computer-executable methods for programmatically generating sentiment scores associated with attribute descriptors.

FIG. 4 is a flowchart illustrating an exemplary computer-implemented method 400 of generating a sentiment score for an attribute descriptor included or mentioned in a consumer review.

In step 402, the text of a consumer review may be received from a non-transitory computer-readable storage device, from an external consumer computing device, via a network device.

In step 404, an attribute descriptor included or mentioned in the text of the consumer review may be identified, received or programmatically extracted. In one example, an identification of the attribute descriptor is received. In another example, the attribute descriptor is programmatically identified and generated form the consumer review. Details on the programmatic generation of attribute descriptors are provided in co-assigned U.S. patent application Ser. No. 14/811,521, titled "System and Method for Programmatic Generation of Attribute Descriptors," filed Jul. 28, 2015, which claims the benefit of U.S. Provisional Patent Application No. 62/033,090, filed on Aug. 4, 2014, each of which is incorporated by reference herein in its entirety.

In step 406, in certain embodiments, a set of grammar rules and a set of adjectives may be received. The set of grammar rules are described in more detail with respect to FIG. 5. Certain definitions used for the set of grammar rules are listed below. Additional definitions are provided at http://nlp.stanford.edu/software/dependencies_manual.pdf, the entire contents of which are expressly incorporated herein by reference.

A: adjectives
N: noun (n1 and n2 also refer to nouns)
V: verb
X: noun or verb (x1 and x2 also refer to either nouns or verbs)
amod: adjectival modifier
nsubj: nominal subject
acomp: adjectival complement
cop: copula
conj: conjunct
neg: negation modifier The set of adjectives may be selected to be relevant to use cases (e.g., great, romantic). Certain adjectives (e.g., red, American) may be excluded from the list as these words are handled as part of the attribute descriptors themselves combined with other adjectives (e.g., "great American food," "fantastic red painted hall").

In step 408, the attribute descriptor may be associated with the consumer review using, for example, a matching identifier, a reference, and the like.

In step 410, the text of the consumer review may be programmatically processed to generate a data structure that represents a dependency grammar (e.g., a parse tree). In certain cases, the dependency grammar may be a parse tree that is an ordered, rooted tree that represents the syntactic structure of the text according to a context-free grammar.

An example data structure that represents a dependency grammar is shown below for the sentence "I liked the food."

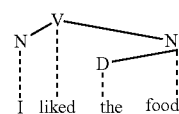

As shown, the data structure of the dependency grammar includes a one-to-one correspondence between sentence elements and nodes (e.g., 5 words and 5 nodes). Elements are linked based on the relationships between the elements, with one node in the data structure corresponding to a particular element (e.g. word) in the sentence. For example, the data structure may be generated by first determining the verb V of the sentence which serves as the root node. Next, the object and subject of the verb may be determined as constituent child nodes of the verb root node. Next, the determiner "the" is identified as a child node of the food noun node.

In some embodiments, the data structure may include a constituency grammar in alternative or addition to the dependency grammar. The constituency grammar does not include a one-to-one correspondence between sentence elements and nodes. Instead, interior (i.e., non-leaf or non-terminating) nodes represent non-terminal categories of the grammar (e.g., sentence, noun phrase, verb phrase), while leaf nodes represent terminal categories (e.g., determiner, noun, verb). An example data structure that represents a constituency grammar is shown below for the sentence "I liked the food."

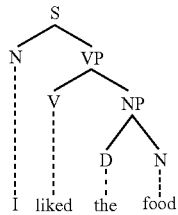

Advantageously, use of the dependency grammar and associated data structure may provide for improved processing efficiency. For example, the dependency grammar is a more efficient data structure that does not include any non-terminal categories of the grammar (e.g., sentence, noun phrase, verb phrase). Furthermore the dependency grammar may provide for increased robustness of programmatic parsing, such, for languages that include free word order or for analyzing informal grammar/writing style.

In step 412, the attribute descriptor and the dependency grammar of the consumer review may be programmatically matched to a set of grammatical rules.

In step 414, a sentiment score may be generated for the attribute descriptor based on the matching of step 412.

In step 416, the generated sentiment score may be stored on a non-transitory storage device in association with the attribute descriptor and the commercial entity/item that was reviewed in the consumer review.

Figure 5:
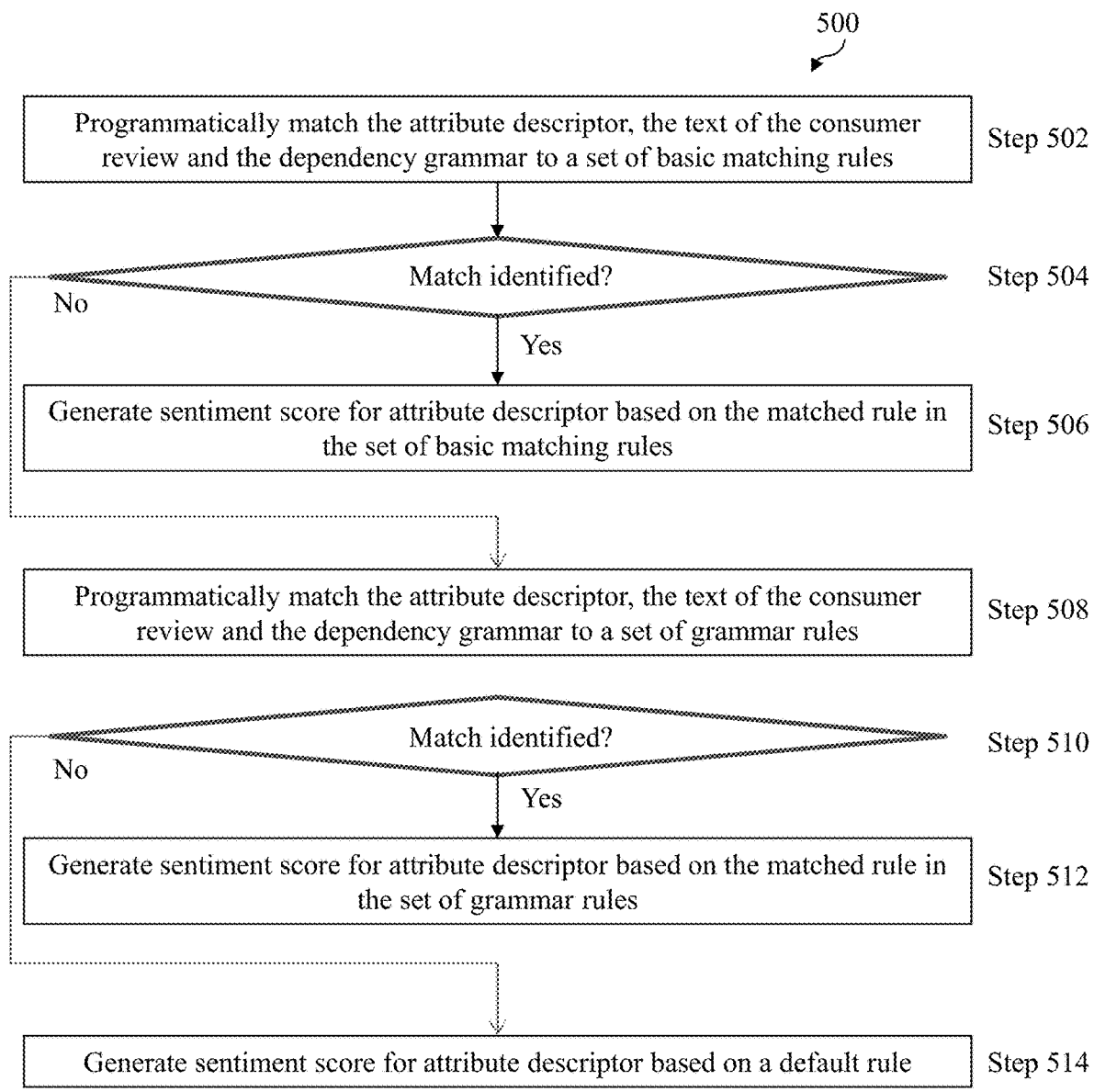

FIG. 5 is a flowchart illustrating an exemplary computer-implemented method 500 of generating a sentiment score for an attribute descriptor based on programmatic matching of the dependency grammar of a consumer review to a set of grammatical rules (as indicated in step 412 of FIG. 4). The grammatical rules may include a set of basic matching rules and a set of grammar rules. The basic matching rules and the grammar rules may be disjoint or overlapping sets. The generated sentiment score may be a value that is independent of the rule used (e.g., +0.5 for a positive score or –0.5 for a negative score), or that may be tailored for each rule.

In step 502, the attribute descriptor and the dependency grammar of the consumer review may be programmatically matched to the set of basic matching rules within the set of grammatical rules.

In an exemplary embodiment, the set of basic matching rules may perform pattern matching for special elements in the immediate surroundings of the attribute descriptor matched. In certain cases, the matched elements may include selected words that may be adjectives or verbs (e.g., "like," "hate"). One example of such an element is "like" associated with an attribute descriptor "burger" in a consumer review "I like their burger." In certain cases, the matched elements may include adjectives within the set of adjectives. One example of such an element is "great" associated with an attribute descriptor "burger" in a consumer review "great burger." In certain cases, the matched elements may include the attribute descriptor and any conjugation of the verb "be" and an adjective. One example of such an element is "awesome" associated with an attribute descriptor "burger" in a consumer review "burger is awesome."

If a match is identified in step 504, then a sentiment score may be generated for the attribute descriptor based on the matched rule in the set of basic matching rules in step 506.

Otherwise, if a match is not identified in step 504, in step 508, the attribute descriptor and the dependency grammar of the consumer review may be programmatically matched to the set of grammar rules within the set of grammatical rules.

In certain cases, the matching may match the attribute descriptor to an adjective or qualifier in the consumer review that applies to the attribute descriptor. The set of grammar rules used in step 508 may include one or more of the following rules.

Rule 1: amod(N, A)→<N, A>
For example, "This camera has great zoom and resolution"→(zoom, great)
Rule 2: nsubj(A, N)→<A, N>
For example, "The burger was amazing"→(amazing, burger)
Rule 3: acomp(V, A)+nsubj(V, N)→<N, A>
For example, "The camera case looks nice"→(case, nice)
Rule 4: cop(A, V)+nsubj(A, N)→<N, A>
For example, "The screen is wide and clear"→(screen, wide)
Rule 5: dobj(V, N)+nsubj(V, PR)→<N, V>
For example, "I love the picture quality" →(picture, love)
Rule 6: <n, x>+neg(x, not)→<n, not+x>
For example, "The battery life is not long" →(battery life, not long)
Rule 7: <n1, x>+conj and (n1, n2)→<n2, x>
For example, "This camera has great zoom and resolution"→(zoom, great), (resolution, great)
Rule 8: <n, x1>+conj and(x1, x2)→<n, x2>
For example, "The screen is wide and clear"→(screen, wide), (screen, clear)

If a match is identified in step 510, then a sentiment score may be generated for the attribute descriptor based on the matched rule in the set of grammar rules in step 512.

Otherwise, if a match is not identified in step 510, in step 514, a sentiment score may be generated for the attribute descriptor based on a default rule. In one example, the default rule may generate a consumer review sentiment score for the overall consumer review, and assign that consumer review sentiment score to the attribute descriptor. Some variations that may be used include using a window of –3 and +4 words from the matching attribute descriptor within the text of the consumer review, generating a sentiment score for the portion of the consumer review within that window, and assigning that sentiment score to be the sentiment score for the matched attribute descriptor. Details on step 514 are provided in co-assigned U.S. patent application Ser. No. 14/811,521, titled "Method and System for Programmatic Analysis of Consumer Reviews," filed Jul. 28, 2015, which claims the benefit of U.S. Provisional Patent Application No. 62/030,549, filed Jul. 29, 2015, each of which is incorporated by reference here in its entirety. In addition, a copy of the above-referenced patent application is attached herewith as Appendices D1 (Figures) and D2 (specification).

In certain embodiments, the sentiment scores associated with one or more attribute descriptors for a commercial entity or item may be displayed to a consumer. In an exemplary embodiment, the most positive and/or most negative sentiment scores for the attribute descriptors for particular commercial entity or item may be ranked for display to a consumer. The rankings may be based, for example, on the sentiment scores for the consumer reviews. The display may be presented, in one embodiment, when a consumer checks a webpage for a promotion for the commercial entity or item, the promotion provided by a promotion and marketing service. In other embodiments, the display may be provided via an email, a mobile application program, and the like.

In an exemplary embodiment implemented for a promotion and marketing service, after a consumer views, interacts with or purchases a promotion for a commercial entity or item, one or more attribute descriptors having positive and/or negative sentiments scores for that commercial entity or item may be displayed for the consumer. The display of the positive sentiment scores may encourage the consumer to redeem the promotion. The display may be presented, in one embodiment, on a webpage for the purchase of the promotion right after the consumer purchases the promotion. In other embodiments, the display may be provided via an email, a mobile application program, and the like.

In an example, a consumer may be enabled to search for commercial entities/items with an attribute descriptor search term. Upon entering an attribute descriptor as a search term, exemplary embodiments may display commercial entities/items with sentiment scores associated with the attribute descriptor above a predetermined threshold.

Figure 6:
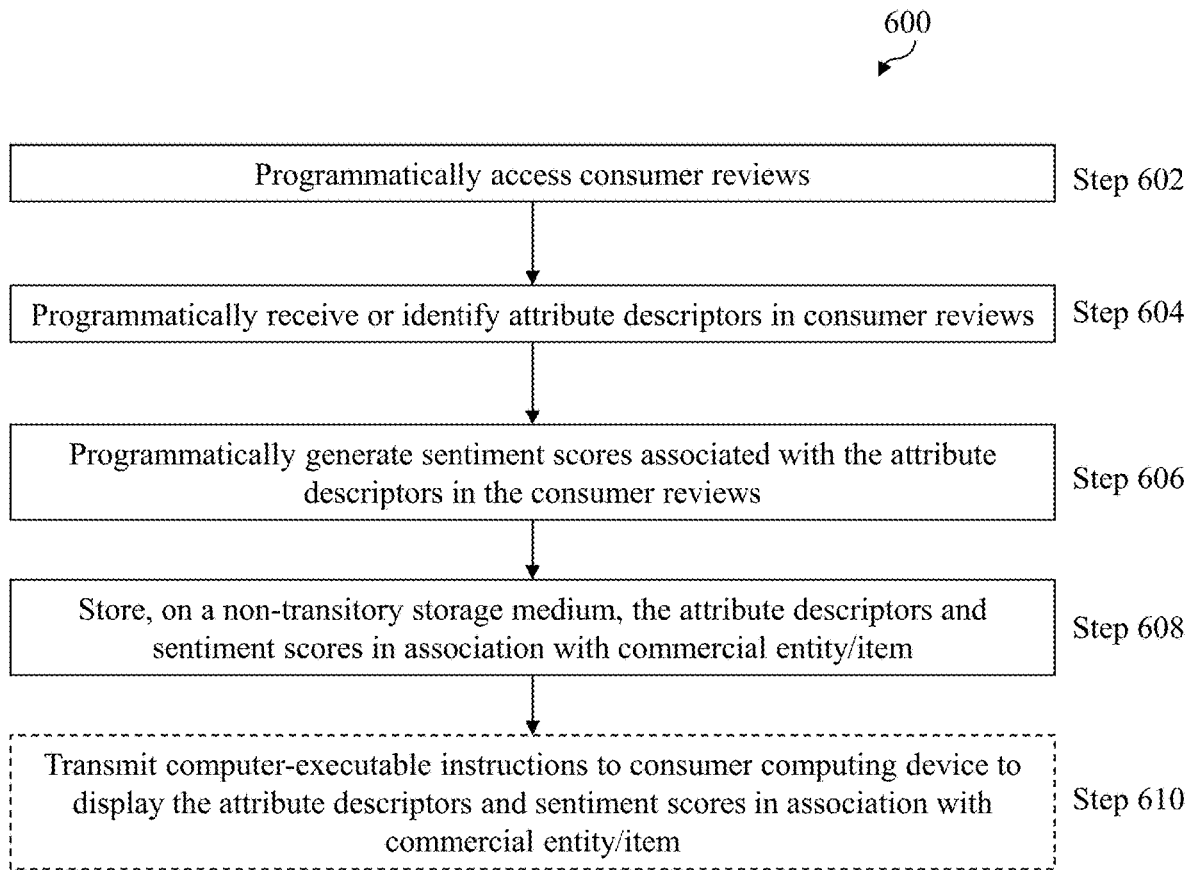
FIG. 6 is a flowchart illustrating an exemplary computer-executable method for generating sentiment scores for attribute descriptors from multiple consumer reviews.
Figure 7:
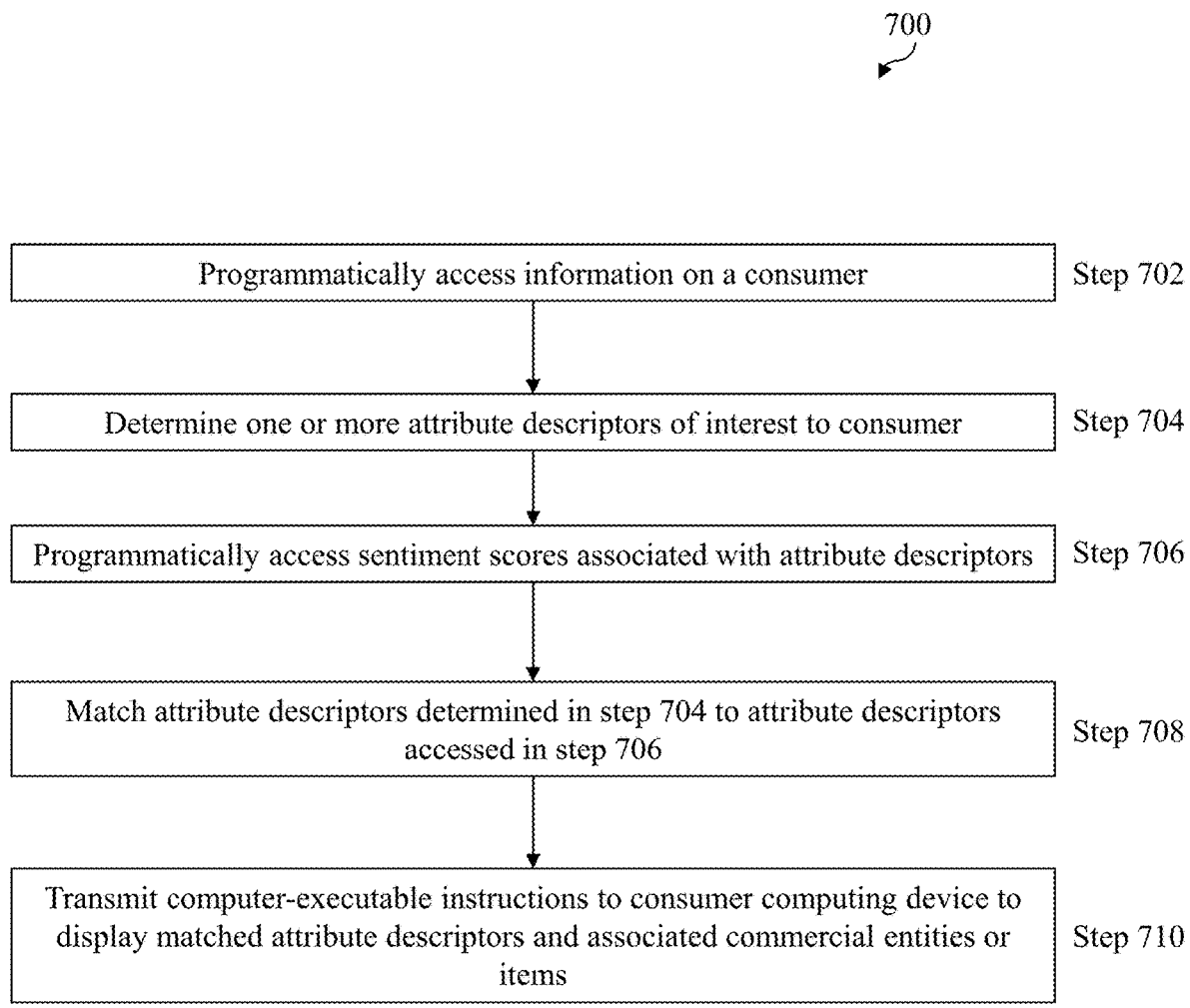
FIG. 7 is a flowcharts illustrating an exemplary computer-executable method for using sentiment scores generated by the methods of FIGS. 4 and 5.

FIGS. 6 and 7 illustrate certain non-limiting exemplary uses of the information programmatically generated using the methods of FIGS. 4 and 5.

FIG. 6 is a flowchart illustrating an exemplary computer-implemented method 600 for programmatically analyzing and processing one or more consumer reviews associated with a commercial entity or item. In step 602, one or more consumer reviews for the commercial entity/item may be received or accessed, for example, via a network device.

In step 604, one or more attribute descriptors included in the consumer reviews may be received or programmatically generated.

In step 606, a sentiment score associated with each attribute descriptor may be programmatically generated. If the sentiment score is generated based on multiple consumer reviews, different sentiment scores generated for the same attribute descriptor for the same commercial entity/item based on different consumer reviews may be aggregated in suitable ways (e.g., by taking a raw or weighted average or median of the sentiment scores) to generate an aggregate sentiment score for the attribute descriptor associated with the commercial entity/item.

In step 608, the generated attribute descriptors and sentiment scores may be saved on a non-transitory computer-readable medium in association with the commercial entity or item.

In step 610, in some embodiments, computer-executable instructions may be transmitted to a consumer computing device to cause a visual display associated with the consumer computing device to display the generated attribute descriptors and/or sentiment scores in association with the commercial entity or item. The computer-executable instructions may, in some cases, be transmitted in response to a request from the consumer computing device for information on the commercial entity or item. In some cases, the request may specify the commercial entity or item. In some cases, the request may specify one or more attribute descriptors of interest to the consumer and, in response, information on commercial entities or items having those attribute descriptors may be displayed.

FIG. 7 is a flowchart illustrating an exemplary computer-implemented method 700 for displaying information on a commercial entity or item using consumer review information. In step 702, information regarding a consumer may be accessed or retrieved, for example, a network device. The consumer information may include data on prior activities of the consumer and/or profile data items. The profile data items may include, but are not limited to, an identification of the consumer, an age of the consumer, a gender of the consumer, a race of the consumer, an income of the consumer, a location associated with the consumer (e.g., a residential location, a work location), a merchant preference of the consumer, a category or sub-category of interest to the consumer, a product preference of the consumer, a price preference of the consumer, and the like. The prior activities may include, but are not limited to, one or more purchase activities, one or more product or merchant viewing activities, one or more product or merchant rating activities, one or more promotion viewing activities, one or more promotion rating activities, and the like.

In step 704, one or more attribute descriptors of interest to the consumer may be generated. For example, if a consumer's prior purchases indicate that he frequents Japanese restaurants, it may be determined that attribute descriptor "sushi" may be an attribute of interest to the consumer.

In step 706, a database of sentiment scores may be accessed from a non-transitory computer-readable storage medium. The database may include a list of commercial entities or items, associated attribute descriptors and associated sentiment scores.

In step 708, the attribute descriptors of interest determined in step 704 may be matched to attribute descriptors in the database accessed in step 706, and corresponding commercial entities or items may be identified in the database. In certain cases, only those commercial entities/items that have sentiment scores for the attribute descriptors of interest above a predetermined threshold may be identified or selected for display in step 710.

In step 710, computer-executable instructions may be transmitted to a consumer computing device to cause information on the commercial entities or items identified in step 708 to be displayed. The displayed information may include the identity of the commercial entity or item identified, the associated attribute descriptors and/or the associated sentiment scores. In some cases, in step 710, a display of the commercial entities or items on the consumer computing device may be ranked based on the sentiment scores for the attribute descriptor of interest.

In some cases, the method of FIG. 7 may be executed to display attribute descriptors and sentiment scores about a particular commercial entity or item to a particular consumer based on a prior activity of the consumer. In one example, if it is determined that the consumer purchased a promotion for a restaurant offered by a promotion and marketing service but has yet to redeem the promotion, then the method of FIG. 7 may be executed to display select information regarding the restaurant to the consumer to encourage him to redeem the promotion. In this case, one or more attribute descriptors of particular interest to the consumer that are in common with attribute descriptors of the restaurant (e.g., "sushi") may be displayed to the consumer with associated sentiment scores for the attribute descriptors of interest. In this manner, the consumer may learn that the restaurant is highly rated for sushi which he is interested in, and may therefore be encouraged to redeem the promotion. In certain cases, negative sentiments may be excluded from a consumer display.

Figure 8A:
FIGS. 8A and 8B illustrate exemplary user interfaces, each recommending a particular merchant to a consumer based on an attribute descriptor associated with the merchant and a sentiment score assigned to the attribute descriptor.
Figure 8B:
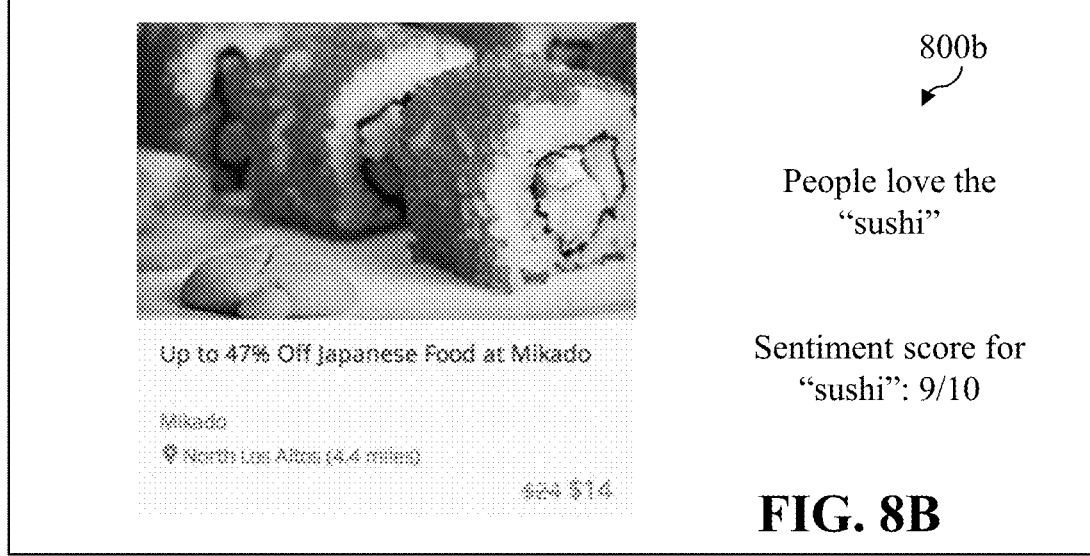

FIGS. 8A and 8B illustrate exemplary user interfaces 800a and 800b, respectively, each recommending a particular merchant to a consumer and including an attribute descriptor for the merchant and an associated sentiment score for the attribute descriptor that is determined based on consumer reviews for that merchant. For example, FIG. 8A indicates an Italian restaurant, an attribute descriptor of "pasta" and a sentiment score of "8 out of a total of 10" for the attribute descriptor. FIG. 8B indicates a Japanese restaurant, an attribute descriptor of "sushi" and a sentiment score of "9 out of a total of 10" for the attribute descriptor.

III. Exemplary Computing Devices

Systems and methods disclosed herein may include one or more programmable processing units having associated therewith executable instructions held on one or more computer readable media, RAM, ROM, hard drive, and/or hardware. In exemplary embodiments, the hardware, firmware and/or executable code may be provided, for example, as upgrade module(s) for use in conjunction with existing infrastructure (for example, existing devices/processing units). Hardware may, for example, include components and/or logic circuitry for executing the embodiments taught herein as a computing process.

Displays and/or other feedback means may also be included, for example, for rendering a graphical user interface, according to the present disclosure. The display and/or other feedback means may be stand-alone equipment or may be included as one or more components/modules of the processing unit(s).

The actual software code or control hardware which may be used to implement some of the present embodiments is not intended to limit the scope of such embodiments. For example, certain aspects of the embodiments described herein may be implemented in code using any suitable programming language type such as, for example, assembly code, C, C# or C++ using, for example, conventional or object-oriented programming techniques. Such code is stored or held on any type of suitable non-transitory computer-readable medium or media such as, for example, a magnetic or optical storage medium.

As used herein, a "processor," "processing unit," "computer" or "computer system" may be, for example, a wireless or wire line variety of a microcomputer, minicomputer, server, mainframe, laptop, personal data assistant (PDA), wireless e-mail device (for example, "BlackBerry," "Android" or "Apple," trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), flash memory storage devices, or the like.

Figure 9:
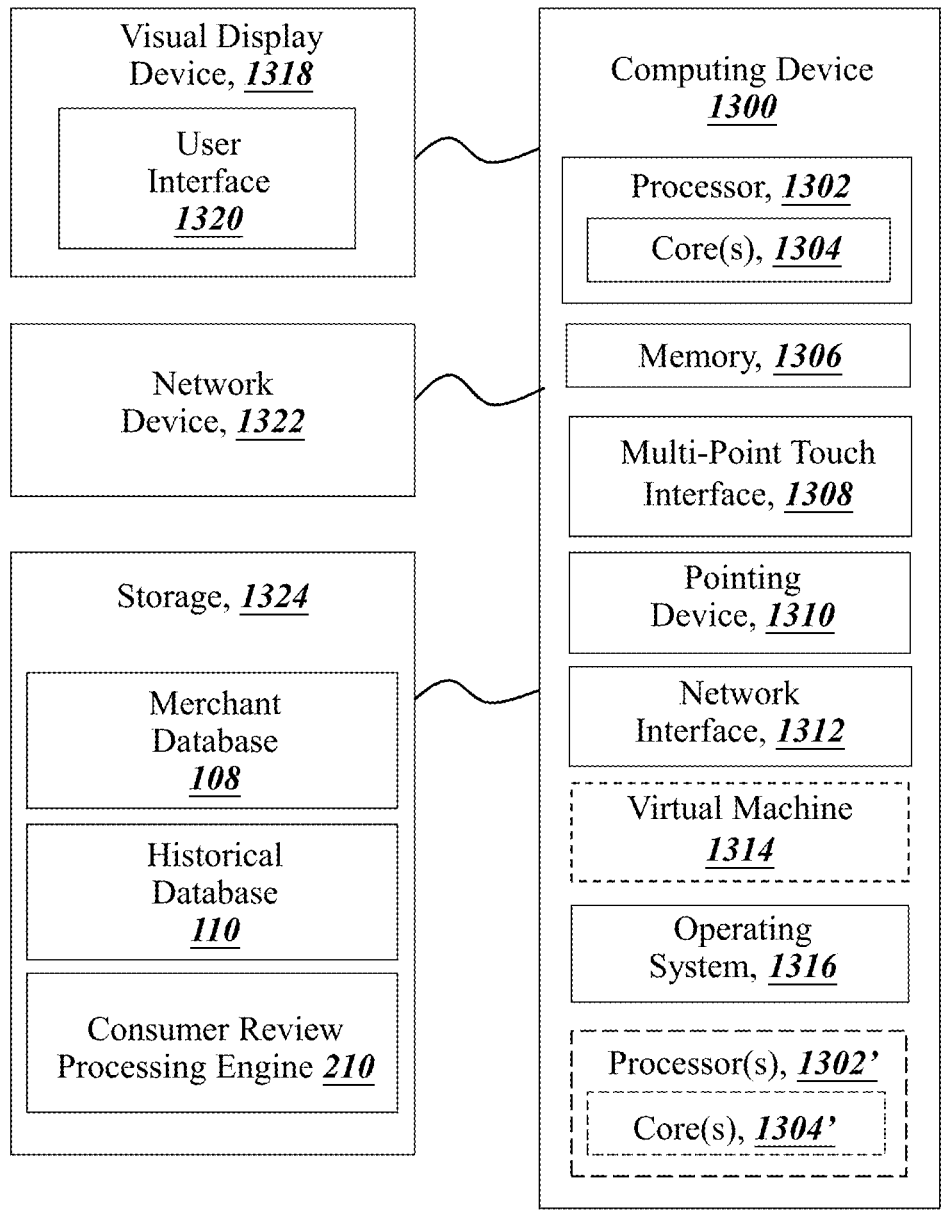
FIG. 9 is a block diagram of an exemplary computing device that may be used to implement and execute exemplary computer-executable methods.

FIG. 9 depicts a block diagram representing an exemplary computing device 1300 that may be used to implement the systems and methods disclosed herein. The computing device 1300 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. In exemplary embodiments, a distributed computational system may include a plurality of such computing devices.

The computing device 1300 includes one or more non-transitory computer-readable media having encoded thereon one or more computer-executable instructions or software for implementing the exemplary methods described herein. The non-transitory computer-readable media may include, but are not limited to, one or more types of hardware memory and other tangible media (for example, one or more magnetic storage disks, one or more optical disks, one or more USB flash drives), and the like. For example, memory 1306 included in the computing device 1300 may store computer-readable and computer-executable instructions or software for implementing a graphical user interface as described herein. The computing device 1300 also includes processor 1302 and associated core 1304, and in some embodiments, one or more additional processor(s) 1302' and associated core(s) 1304' (for example, in the case of computer systems having multiple processors/cores), for executing computer-readable and computer-executable instructions or software stored in the memory 1302 and other programs for controlling system hardware. Processor 1302 and processor(s) 1302' may each be a single core processor or a multiple core (1304 and 1304') processor.

Virtualization may be employed in the computing device 1300 so that infrastructure and resources in the computing device may be shared dynamically. A virtual machine 1314 may be provided to handle a process running on multiple processors so that the process appears to be using only one computing resource rather than multiple computing resources. Multiple virtual machines may also be used with one processor.

Memory 1306 may include a computer system memory or random access memory, such as DRAM, SRAM, EDO RAM, and the like. Memory 1306 may include other types of memory as well, or combinations thereof.

A user may interact with the computing device 1300 through a visual display device 1318, such as a screen or monitor, which may display one or more graphical user interfaces 1320 provided in accordance with exemplary embodiments described herein. The visual display device 1318 may also display other aspects, elements and/or information or data associated with exemplary embodiments.

The computing device 1300 may include other I/O devices for receiving input from a user, for example, a keyboard or any suitable multi-point touch interface 1308 or pointing device 1310 (e.g., a mouse, a user's finger interfacing directly with a display device). As used herein, a "pointing device" is any suitable input interface, specifically, a human interface device, that allows a user to input spatial data to a computing system or device. In an exemplary embodiment, the pointing device may allow a user to provide input to the computer using physical gestures, for example, pointing, clicking, dragging, dropping, and the like. Exemplary pointing devices may include, but are not limited to, a mouse, a touchpad, a finger of the user interfacing directly with a display device, and the like.

The keyboard 1308 and the pointing device 1310 may be coupled to the visual display device 1318. The computing device 1300 may include other suitable conventional I/O peripherals. The I/O devices may facilitate implementation of the one or more graphical user interfaces 1320, for example, implement one or more of the graphical user interfaces described herein.

The computing device 1300 may include one or more storage devices 1324, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement exemplary embodiments as taught herein. In exemplary embodiments, the one or more storage devices 1324 may provide storage for data that may be generated by the systems and methods of the present disclosure. For example, a storage device 1324 may provide storage for a merchant database 108 including information on one or more merchants, and for a historical database 110 including information on one or more prior activities performed by consumers and profile information on consumers. A storage device 1324 may also provide storage for a consumer review processing engine 210. The one or more storage devices 1324 may be provided on the computing device 1300 and/or provided separately or remotely from the computing device 1300. The exemplary components depicted as being stored on storage device 1324 may be stored on the same or on different storage devices.

The computing device 1300 may include a network interface 1312 configured to interface via one or more network devices 1322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1312 may include a built-in network adapter, network interface card, PCMCIA network card, card bus network adapter, wireless network adapter, USB network adapter, modem or any other device suitable for interfacing the computing device 1300 to any type of network capable of communication and performing the operations described herein. The network device 1322 may include one or more suitable devices for receiving and transmitting communications over the network including, but not limited to, one or more receivers, one or more transmitters, one or more transceivers, one or more antennae, and the like.

The computing device 1300 may run any operating system 1316, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1316 may be run in native mode or emulated mode. In an exemplary embodiment, the operating system 1316 may be run on one or more cloud machine instances.

One of ordinary skill in the art will recognize that exemplary computing device 1300 may include more or fewer modules than those shown in FIG. 9.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by $\frac{1}{20}$th, $\frac{1}{10}$th, $\frac{1}{5}$th, $\frac{1}{3}$rd, $\frac{1}{2}$nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer modules than those illustrated in the exemplary block diagrams.

Many modifications, combinations and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications, combinations and other embodiments are intended to be included within the scope of the appended claims. Although specific terms are employed herein, they are used in a generic and descriptive sense only and not for purposes of limitation.

What is claimed is:

1. A computer apparatus, comprising:
a consumer review processing engine configured to programmatically parse text of a consumer review to identify an attribute descriptor and analyze the text of the consumer review to generate a sentiment score associated with the attribute descriptor, wherein the consumer review processing engine configured to programmatically analyze the text of the consumer review to generate the sentiment score associated with the attribute descriptor includes the consumer review processing engine being configured to:
execute a natural language processing engine to parse the text of the consumer review and thereby generate a data structure representing a dependency grammar of the text of the consumer review, wherein the data structure includes one or more nodes representing one or more sentence elements in the text of the consumer review, and wherein each verb in the one or more sentence elements in the text of the consumer review is represented by a root node;
programmatically apply a matching rule set to the attribute descriptor and the data structure;
upon identifying a match between the attribute descriptor and the data structure to at least one match rule of the matching rule set, programmatically generate the sentiment score based on the at least one match rule of the matching rule set;
upon identifying no match between the attribute descriptor and the data structure to each match rule of the matching rule set, programmatically apply a grammar rule set to the attribute descriptor and the data structure;
upon identifying a grammar match between at least one grammar rule of the grammar rule set and the attribute descriptor and the data structure, programmatically generate the sentiment score based on the at least one grammar rule; and
select data associated with a commercial entity and/or a commercial item for a promotion based on the attribute descriptor and the sentiment score; and
a network device configured to transmit one or more computer-executable instructions to a consumer computing device to facilitate rendering of the promotion associated with the commercial entity and/or the commercial item via an electronic interface of the consumer computing device.

2. The apparatus of claim 1, wherein the consumer review processing engine is further configured to:
transmit, via the network device, one or more computer-executable instructions to a computing device, the one or more computer-executable instructions programmed to cause the computing device to visually display the attribute descriptor and the sentiment score in association with the one or more of the commercial entity or the commercial item.

3. The apparatus of claim 1, wherein the consumer review processing engine is further configured to:
upon determining no match between one or more grammar rules of the set of grammar rules and the attribute descriptor and the data structure, programmatically generate the sentiment score based on a default rule, wherein the default rule includes programmatically generating a consumer review sentiment score associated with an entirety of the consumer review.

4. The apparatus of claim 3, wherein the consumer review processing engine is further configured to:
programmatically generate the consumer review sentiment score based on programmatic analysis of the text of the consumer review.

5. The apparatus of claim 4, wherein the consumer review processing engine configured to generate the consumer review sentiment score includes the consumer review processing engine being configured to:
execute the natural language processing engine to programmatically parse the text of the consumer review into a set of sentences;
execute the natural language processing engine to programmatically parse each sentence in the set of sentences into a set of words;
for each word in the set of words in each sentence, programmatically generate a word sentiment score;
for each sentence in the set of sentences, programmatically generate a sentence sentiment score, the sentence sentiment score generated based on word sentiment scores associated with words in the sentence; and
programmatically generate the consumer review sentiment score by combining sentence sentiment scores associated with the set of sentences in the text of the consumer review.

6. The apparatus of claim 5, wherein the consumer review processing engine configured to generate the first sentence sentiment score for the first sentence in the consumer review includes the consumer review processing engine being configured to:
programmatically identify one or more emoticons in the first sentence; and
assign one or more emoticon scores to the one or more emoticons based on sentiments expressed in the emoticons;
wherein the first sentence sentiment score is determined based on the one or more emoticon scores.

7. The apparatus of claim 5, wherein the consumer review processing engine configured to generate the first sentence sentiment score for the first sentence in the consumer review includes the consumer review processing engine being configured to:
programmatically generate a word polarity score, the word polarity score indicating whether a sentiment expressed in the first word is positive, negative, neutral or unknown;
wherein the first word sentiment is generated based on the word polarity score.

8. The apparatus of claim 7, wherein the consumer review processing engine configured to programmatically generate the word polarity score includes the consumer review processing engine being configured to:
detect a plurality of consecutive vowels in the first word; and
adjust the word polarity score based on the plurality of consecutive vowels.

9. The apparatus of claim 5, wherein the consumer review processing engine configured to generate the first sentence sentiment score for the first sentence in the consumer review includes the consumer review processing engine being configured to:
programmatically generate a word negation score, the word negation score indicating whether there is a negation in the context of the first word;
wherein the first word sentiment is generated based on the word negation score.

10. The apparatus of claim 5, wherein the consumer review processing engine configured to programmatically generate the first word sentiment score for the first word in in the set of words in each sentence comprises:
  programmatically generate a word intensity score, the word intensity score indicating an intensity or magnitude of the sentiment expressed in the first word;
  wherein the first word sentiment is generated based on the word intensity score.

11. The apparatus of claim 10, wherein the consumer review processing engine configured to programmatically generate the word intensity score includes the consumer review processing engine being configured to:
  detect a plurality of consecutive vowels in the first word; and
  adjust the word intensity score based on the plurality of consecutive vowels.

12. The apparatus of claim 5, wherein the consumer review processing engine configured to programmatically generate the word intensity score includes the consumer review processing engine being configured to:
  detect whether the first word includes all capital letters; and
  adjust the word intensity score if the first word includes all capital letters.

13. The apparatus of claim 1, wherein the consumer review processing engine is further configured to:
  programmatically analyze prior purchase data or profile data associated with a first consumer to generate a first attribute descriptor of interest to the first consumer;
  programmatically match the first attribute descriptor to the attribute descriptor included in the text of the consumer review; and
  based on the matching, transmit computer-executable instructions to a computing device associated with the first consumer to cause a visual display device associated with the computing device to display the attribute descriptor and the sentiment score in association with the commercial entity and/or the commercial item.

14. The apparatus of claim 1, wherein the consumer review processing engine is further configured to:
  programmatically analyze prior purchase data or profile data associated with a first consumer to generate a first attribute descriptor of interest to the first consumer;
  programmatically match the first attribute descriptor to the attribute descriptor included in the text of the consumer review; and
  based on the matching and based on the generated sentiment score associated with the attribute descriptor, transmit computer-executable instructions to a computing device associated with the first consumer to cause a visual display device associated with the computing device to display a recommendation of the commercial entity and/or the commercial item.

15. The apparatus of claim 14, wherein the recommendation includes an impression of a promotion provided by a promotion and marketing service in association with the commercial entity and/or the commercial item.

16. The apparatus of claim 1, wherein the attribute descriptor indicates one of:
  a context associated with the commercial entity and/or the commercial item;
  a quality associated with the one or more of the commercial entity or the commercial item;
  the commercial item; or
  a category or sub-category associated with the one or more of the commercial entity or the commercial item.

* * * * *

UNITED STATES PATENT AND TRADEMARK OFFICE
CERTIFICATE OF CORRECTION

| | | |
|---|---|---|
| PATENT NO. | : 10,977,667 B1 | Page 1 of 1 |
| APPLICATION NO. | : 14/919111 | |
| DATED | : April 13, 2021 | |
| INVENTOR(S) | : L'Huillier | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 891 days.

Signed and Sealed this
Twentieth Day of September, 2022

*Katherine Kelly Vidal*

Katherine Kelly Vidal
*Director of the United States Patent and Trademark Office*